(12) United States Patent
O'Donovan et al.

(10) Patent No.: US 8,988,970 B2
(45) Date of Patent: Mar. 24, 2015

(54) METHOD AND SYSTEM FOR DEREVERBERATION OF SIGNALS PROPAGATING IN REVERBERATIVE ENVIRONMENTS

(75) Inventors: Adam O'Donovan, Silver Spring, MD (US); Ramani Duraiswami, Highland, MD (US); Dmitry N. Zotkin, Greenbelt, MD (US)

(73) Assignee: University of Maryland, College Park, MD (US)

( * ) Notice: Subject to any disclaimer, the term of this patent is extended or adjusted under 35 U.S.C. 154(b) by 511 days.

(21) Appl. No.: 13/047,311

(22) Filed: Mar. 14, 2011

(65) Prior Publication Data

US 2011/0222372 A1    Sep. 15, 2011

Related U.S. Application Data

(60) Provisional application No. 61/313,467, filed on Mar. 12, 2010.

(51) Int. Cl.
| | |
|---|---|
| *G01S 15/00* | (2006.01) |
| *G01S 3/808* | (2006.01) |
| *H04R 1/40* | (2006.01) |
| *H04R 3/00* | (2006.01) |
| *G10L 25/24* | (2013.01) |

(Continued)

(52) U.S. Cl.
CPC .............. *G01S 3/8083* (2013.01); *H04R 1/406* (2013.01); *H04R 3/005* (2013.01); *G10L 25/24* (2013.01); *G10L 2021/02082* (2013.01); *G10L 2021/02166* (2013.01); *H04R 2201/401* (2013.01); *H04R 2430/20* (2013.01)
USPC .......................................... 367/103; 367/125

(58) Field of Classification Search
CPC .................................................... H04R 2430/20
USPC .......................................... 367/7–11, 47, 103
See application file for complete search history.

(56) References Cited

U.S. PATENT DOCUMENTS

| | | | |
|---|---|---|---|
| 6,249,680 B1 * | 6/2001 | Wax et al. .................. | 455/456.2 |
| 7,587,054 B2 | 9/2009 | Elko et al. | |
| 7,724,355 B1 * | 5/2010 | McIntosh et al. ............ | 356/5.01 |

(Continued)

OTHER PUBLICATIONS

Nishiura, Acoustics, Speech, and Signal Processing, 2001. Proceedings. (ICASSP '01). 2001 IEEE International Conference., pp. 189-192.*

(Continued)

*Primary Examiner* — Luke Ratcliffe
*Assistant Examiner* — Hovhannes Baghdasaryan
(74) *Attorney, Agent, or Firm* — Rosenberg, Klein & Lee

(57) ABSTRACT

The dereverberation of signals in reverberating environments is carried out via acquiring the representation (image) of spatial distribution of the signals in space of interest and automatic identification of reflections of the source signal in the reverberative space. The technique relies on identification of prominent features at the image, as well as corresponding directions of propagation of signals manifested by the prominent features at the image, and computation of similarity metric between signals corresponding to the prominent features in the image. The time delays between the correlated signals (i.e., source signal and related reflections) are found and the signals are added coherently. Multiple beamformers operate on the source signal and corresponding reflections, enabling one to improve the signal-to-noise ratio in multipath environments.

19 Claims, 10 Drawing Sheets

(51) Int. Cl.
*G10L 21/0208* (2013.01)
*G10L 21/0216* (2013.01)

(56) References Cited

U.S. PATENT DOCUMENTS

| | | | |
|---|---|---|---|
| 8,077,540 B2* | 12/2011 | Williams | 367/8 |
| 2007/0159924 A1* | 7/2007 | Vook et al. | 367/127 |
| 2008/0288255 A1* | 11/2008 | Carin et al. | 704/256.1 |
| 2009/0028347 A1* | 1/2009 | Duraiswami et al. | 381/26 |
| 2010/0103776 A1* | 4/2010 | Chan | 367/119 |
| 2010/0142327 A1* | 6/2010 | Kepesi et al. | 367/124 |

OTHER PUBLICATIONS

Li, Z., et al.; "Flexible layout and optimal cancellation of the orthonormality error for spherical microphone arrays"; Proc. IEEE Int. Conf. on Acoustics, Speech, and Signal Processing, ICASSP'04.

Li, Z., et al.; "Flexible and Optimal Design of Spherical Microphone Arrays for Beamforming"; IEEE Transactions on Audio, Speech, and Language Processing; vol. 15; Issue 2; pp. 702-714; Feb. 2007.

Meyer J., et al.; "A highly scalable spherical microphone array based on an orthonormal decomposition of the soundfield," IEEE ICASSP 2002, 2:1781-1784.

O'Donovan, A., et al.; "Microphone arrays as Generalized Cameras for Integrated Audio Visual Processing", IEEE Conference on Computer Vision and Pattern Recognition (CVPR), Minneapolis, 2007.

O'Donovan, A., et al.; "Real Time Capture of Audio Images and Their Use with Video"; Proceedings 2007 IEEE Workshop on Applications of Signal Processing to Audio and Acoustics.

O'Donovan, A., et al.; "Imaging concert hall acoustics using visual and audio cameras"; ICASSP 2008: 5284-5287.

Van Veen, B., et al.; "Beamforming: A versatile approach to spatial filtering," IEEE AASP Magazine, vol. 5, pp. 4-24, 1988.

Zotkin, D., et al.; "Sound field decomposition using spherical microphone arrays"; IEEE International Conference on Acoustics, Speech and Signal Processing, 2008. ICASSP 2008; pp. 277-280; Mar. 31-Apr. 4, 2008.

Bimbot, F., et al.; "A tutorial on text-independent speaker verification"; EURASIP Journal on Applied Signal Processing, 4, 430-451, 2004.

Duraiswami, R., et al.; "High Order Spatial Audio Capture and its Binaural Head-Tracked Playback over Headphones with HRTF Cues"; Presented at the 119th Convention of the Audio Engineering Society, Oct. 7-10, 2005 New York, NY.

Jan, E., et al.; "Matched-filter processing of microphone array for spatial volume selectivity"; 1995 IEEE International Symposium on Circuits and Systems, ISCAS '95., Apr. 30-May 3, 1995; 1460-1463 vol. 2.

Kinnunen, T; "Optimizing spectral feature based text-Independent speaker recognition"; Academic dissertation; University of Joensuu, 2005.

B. Rafaely, "Analysis and design of spherical microphone arrays," IEEE Trans. Speech Audio Process., vol. 13, pp. 135-143, Jan. 2005.

* cited by examiner

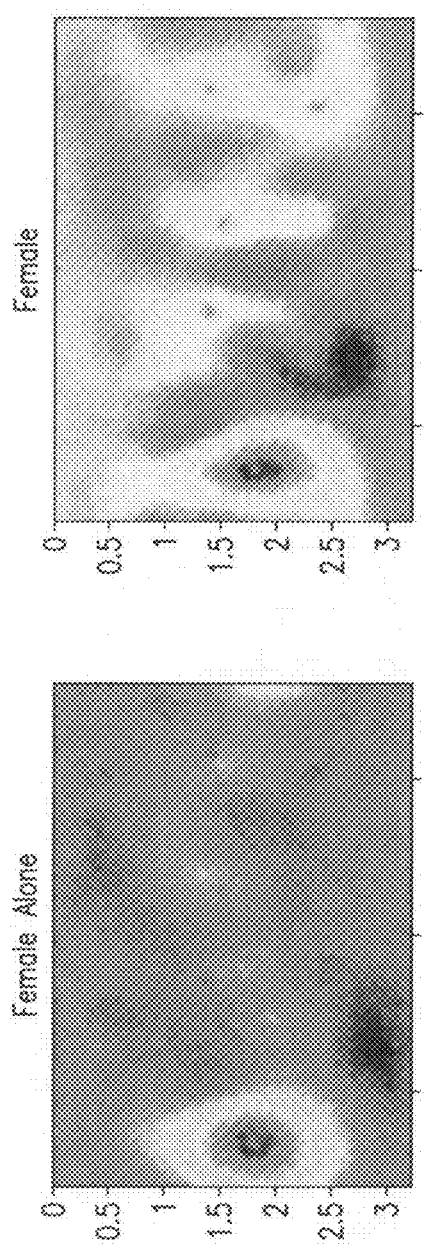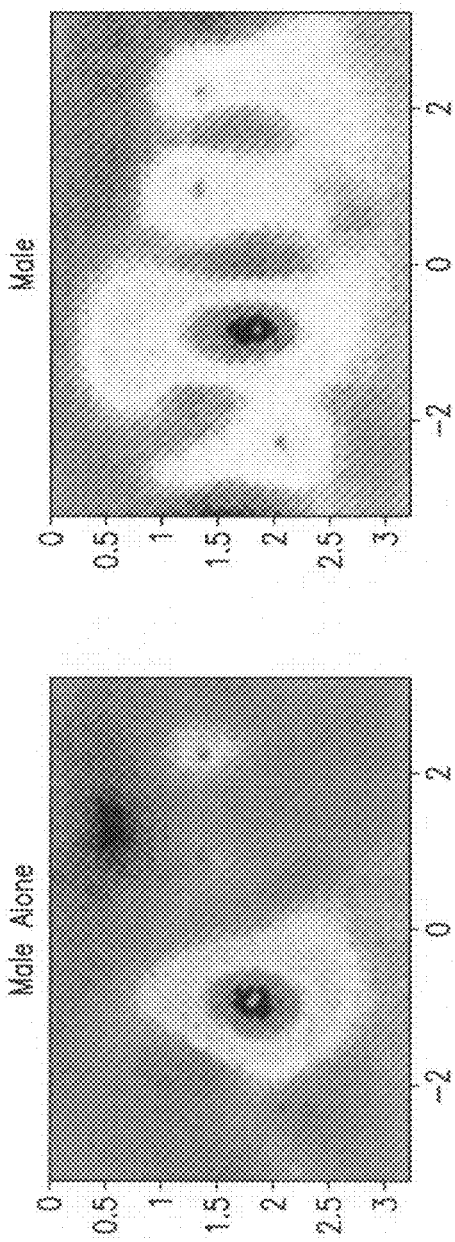

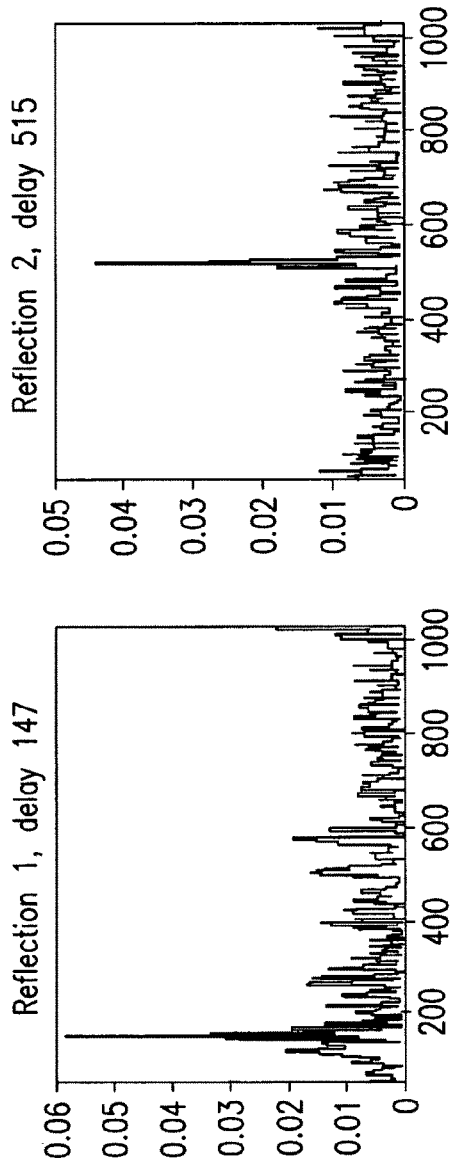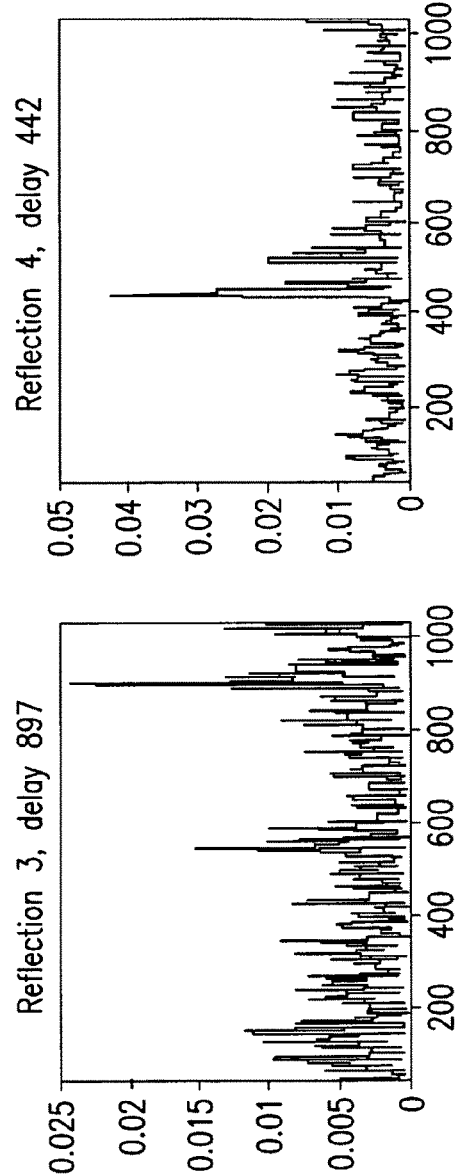

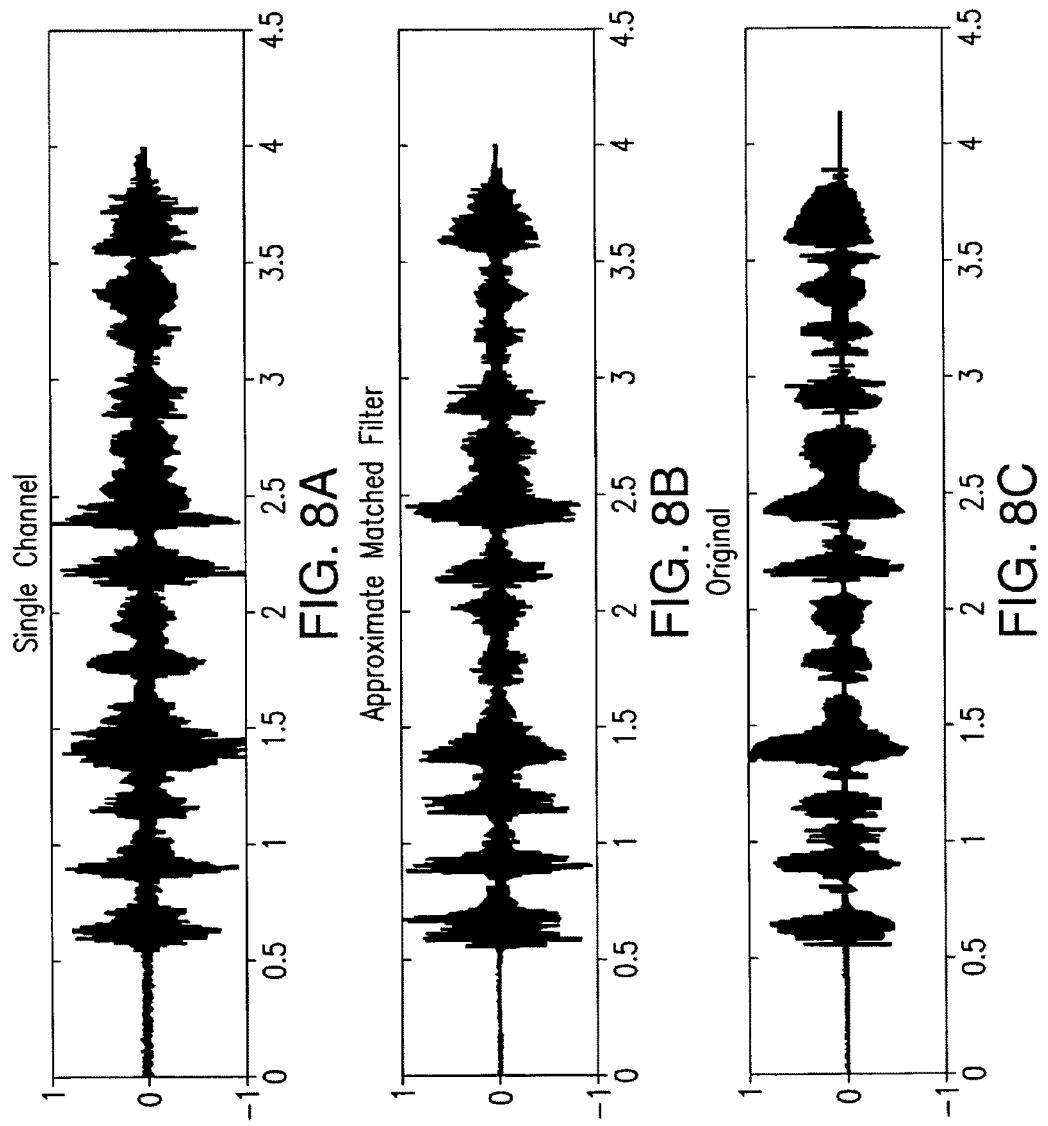

METHOD AND SYSTEM FOR DEREVERBERATION OF SIGNALS PROPAGATING IN REVERBERATIVE ENVIRONMENTS

REFERENCE TO RELATED PATENT APPLICATION

This Utility Patent Application is based on a Provisional Patent Application Ser. No. 61/313,467 filed on 12 Mar. 2010.

FIELD OF THE INVENTION

The current invention is directed to data processing, and in particular to processing of signals propagating in reverberative or multipath environments.

More in particular, the present invention is directed to dereverberation of signals traveling in realistic environments by processing a representation of spatial distribution of the propagating signals mapped to the space of interest and recovering both the signals arrived directly from their sources and multiple signal reflections based on locations of prominent features corresponding to the direct signal and their reflections found in the spatial distribution representation.

The present invention further is directed to recovery of signals propagating in reverberative environments where the dereverberated output signal is obtained by coherently adding the recovered signal reflections in the space of interest to the portion of the signal arriving directly from the source, thereby greatly improving the signal-to-noise ratio (SNR) of the resulting output signal.

The present invention is also directed to a computational technique, i.e., matched filter processing, designed for the deconvolution of signals propagating in realistic environments, which is performed in real-time and automatically by processing a multi-dimensional image of spatial distribution of signals co-registered with the space of interest created via using a sensor array cooperating with video camera(s). The computational technique is designed for finding the directions of signals and their reflections propagation, correlating the reflections to their signal sources, and coherently adding the reflections to their respective directly arrived signals in order to create cleaned and dereverberated source signals.

In addition, the present invention is directed to a method and system for determining the approximate inverse filter for a space of interest from the pattern of the strongest reflections observed by a spherical audio camera and correlated to a source of interest through a similarity metric. The beamformed outputs from the identified reflection directions are added coherently to the source signal of interest by estimating the time delays therebetween.

The present invention also is directed to a technique employing multiple beamformers operating both on the original source and its reflections, enabling one to improve the signal-to-noise ratio in multi-path environments by real-time automatic identification of reflections of a sound source in the space of interest by isolating (identifying) the prominent peaks found in an audio image of signals mapped to the space of interest acquired by an audio camera, grouping them through the use of the similarity metric, estimating time delays between the signals within the same group, and summing signals of the same group coherently.

BACKGROUND OF THE INVENTION

The signal recorded at a microphone incorporates the portion of the signal traveling directly ("direct" part of the signal) from the target source s as well as delayed and possibly modified copies of the signal that reach the microphone after interaction with the environment. The recorded signal is also contaminated with noise n and the sound that is created by other "distracter" sources $t_i$. In many applications, it is desired to preferentially extract the target source signal s from the recording while suppressing both noise and distracters. The influence of the room or environment on the target and distracter sources may be modeled via individual source-to-microphone Room Impulse Responses (RIR) h. According to the RIR model, the received signal at a microphone $m_j$ in an N element array may be characterized as $$m_j = s * h_{sj} + \sum_i t_i * h_{tij} + n_j \quad \text{(Eq. 1)}$$

$$j = 1, \ldots N.$$

where the sign "*" denotes a convolution operation applied to the affected functions in the Eq. 1.

A number of algorithms exist which focus only on the "direct" part of the signal, and the distracters are often considered just to be the part of the noise term. In this case $$m_j = s + s * h_{sj}' + N_j, j = 1, \ldots N. \quad \text{(Eq. 2)}$$

where $h_j'$ is $h_{sj}$ with the direct path removed and $N_j$ is the overall noise in the room.

In this situation, the ability to recover s depends upon the structure of $h_{sj}'$; and the amount of noise. If the "direct" path is a substantial fraction of the received signal, then s may be recovered. When the environment is very reverberant, s is likely to be very correlated with $s*h_{sj}'$, and the recovery of s is difficult.

In order to alleviate this difficulty, a room filter may be estimated and applied to the signal. A linear time-domain filter known as Room Impulse Response (RIR) may characterize the effect of the environment on the signal. The RIR may be computed using simple geometric computations, advanced ray-tracing techniques, or numeric methods for the complicated scatter shapes. However, these computations are extremely expensive to implement.

Additionally, the RIR inversion in an attempt to derive a deconvolution filter is a numerically unstable procedure, and in order to derive useful results, the RIR computation is to be performed with high accuracy, which is practically impossible to achieve in realistic environments.

Furthermore, any source displacement by as much as a few centimeters requires the RIR recomputation in order to keep higher frequencies coherent. The RIR recomputation requires the three-dimensional position information which is difficult to obtain in realistic environments.

Another approach aimed to enhance the desired signal in a digital mixture through the use of the spatial sound processing (beamforming) with a microphone array is presented in B. D. Van Veen, et al., "Beamforming: A versatile approach to spatial filtering", IEEE ASSP Magazine 1988, v. 5, pp. 4-24. In a microphone array, several microphones are placed in a number of locations in space, and the signals arriving at the microphone array are filtered and summed so that the signals originating from a desired location (e.g., a signal source) are amplified compared to the rest of signal.

In the case of the microphone array, the RIR is specific for each microphone in the array. Beamforming usually assumes that the location of interest is given and requires recomputation of the filters with a change of location. Some approaches also adaptively modify the filters in order to suppress unwanted interference, where the interference is broadly defined as signals uncorrelated with the source signal. This approach is obviously ineffective in removing the reverberant parts of the signal.

Due to complications associated with exact tracking of the target source in a three-dimensional environment, in many applications, such as source localization and speech recognition, the reverberative patterns imposed by the environment are undesirable. A Matched Filter Array (MFA) processing is an example of how the reverberation may be used constructively.

MFA processing is a combination of beamforming and RIR deconvolution. MFA may be considered as beamforming aimed not only at the sound source itself but also at its reflections. In order to perform MFA processing, knowledge of the RIR for each microphone in the array is necessary. It may be either computed analytically using a room model and source/receiver positions, or may be measured in the actual environment where the beamforming has to be applied.

An MFA analog of a simple delay-and-sum beamforming is obtained by truncating and inverting the RIR and inserting fixed time delay to make the resulting filter causal. In a simulated multi-path environment, the Signal-to-Noise Ratio (SNR) of the beamformer remains independent of a number of propagation paths, as these are compensated automatically by inverse filtering. However, accurate knowledge of RIR is still necessary for processing, as the MFA performance degrades quickly with RIR inaccuracies caused by uncertainty in the source position.

Microphone arrays, such as spherical microphone arrays, provide an opportunity to study a complete spatial characteristic of the sound received at a particular location. Over the past years, there have been several publications that report the use of spherical microphone arrays (e.g., J. Meyer, et al., "A highly scalable spherical microphone array based on an orthonormal decomposition of the soundfield," Proc. IEEE ICASSP, 2002; B. Rafaely, "Analysis and Design of Spherical Microphone Arrays," IEEE Trans. Speech and Audio Proc. 13: 135-143, 2005; Z. Li et al., "Flexible layout and optimal cancellation of the orthonormality error for spherical microphone arrays," Proc. IEEE ICASSP 2004). Such arrays are seen by some researchers as a means to capture a representation of the sound field in the vicinity of the array, or as a means to digitally beamform sound from different directions using the array with a relatively high order beampattern.

In particular, it is possible to create audio images using the spherical array. This may be done by digitally "steering" the beamformer at many combinations of elevation and azimuth angles ($\theta, \phi$) in the spherical coordinate system and representing the beamformer output power as an image. Audio camera using microphone arrays for real-time capture of audio images and method for jointly processing the audio images with video images are described in the Patent Application Publication No. 2009/0028347 authored by Duraiswami, et al. The subject matter of the document overlaps with A. E. O'Donovan, et al., "Microphone arrays as generalized cameras for integrated audio visual processing" (Proc. IEEE CVPR 2007) which shows that the images created, similarly to regular visual camera images, are "central-projection" images. In the same paper the technique for joint calibration of audio and video cameras were suggested, and the applications of the joint analysis of audio and visual images were introduced.

In addition, in A. E. O'Donovan, et al., "Real time capture of Audio images and their use with video," Proc. IEEE WASPAA, 2007, it was shown how the audio cameras operate at frame-rate by using the parallel nature of the computations, efficient factorizations, and the availability of extreme amounts of processing power in modern graphical processors.

Also, in A. E. O'Donovan, et al., "Imaging Concert Hall acoustics using visual and audio cameras," Proc. IEEE ICASSP, 2008, it was shown how the audio camera, with its output mapped to a visual camera image, could be used to analyze the reverberant structure of concert halls.

Therefore, it would be desirable to provide a computationally effective algorithm to compute automatically, and in real-time, the room impulse response through the processing of the audio images of signals co-registered with the space of interest acquired by the spherical audio camera.

SUMMARY OF THE INVENTION

It is therefore an object of the present invention to provide a computationally efficient technique for dereverberation of signals propagating in realistic environments.

It is a further object of the present invention to provide a dereverberation method and system which processes, automatically and in real-time, a representation of spatial distribution of signals propagating in a space of interest to identify "direct" signals, as well as their significant reflections, and to correlate the reflections to their respective "direct" signals based on similarity measures in order to coherently add the reflections with their respective "direct" signals, thereby generating a dereverberated output signal.

It is a further object of the present invention to provide an algorithm to automatically instantiate a matched filter processor that is able to perform the deconvolution of the source signal from the room impulse response using an audio image co-registered with the environment of interest acquired by the spherical audio camera to identify therein the direct signal of interest and its reflections which manifest themselves as peaks, also referred to herein as prominent features. These peaks are grouped based on a similarity measure, thus correlating the reflections to their "direct" signal, and after time delays between signals in each group are estimated and beamformed outputs from the identified reflection directions are delayed appropriately, the beamformed reflections are summed coherently with the respective beamformed "direct" signal.

In one aspect, the present invention constitutes a method for dereverberation of signals through the steps of:

beamforming signals propagating in a space of interest to create a representation of a spatial distribution of the signals mapped to the space of interest, and identifying, automatically and in real-time, using that spatial distribution representation, a source of interest and a plurality of reflections manifesting themselves by prominent features, as well as their respective propagation directions.

The novel method further proceeds through applying a similarity measure to signals arrived from the directions corresponding to the prominent features in order to correlate the signal reflections to the target source of interest if the similarity reaches a predetermined threshold.

Once the reflection signals have been identified for the target source of interest, they are appropriately time delayed and coherently summed to the directly arrived source signal to produce the dereverberation output signal.

In a specific exemplary case of processing acoustic waves, an audio image co-registered with the space of interest is acquired by a spherical audio camera. The audio camera computes the audio image, e.g., a map of acoustic energy distribution in the space surrounding the microphone array.

The symmetric configuration of the audio camera permits digital steering of the beam pattern in arbitrary directions without distorting the beam pattern shape.

The beamformer processor is applied to the acoustic signals received at the audio camera, which operates by decomposing the acoustic wavefield into a number of spherical modes corresponding to elementary solutions of the acoustic wave propagation equation and then combining the modes with weights derived from the desired beam pattern. In the present algorithm, high resolution real-time audio imaging of the space is achieved by operating a number of independent beamformers in parallel. By beamforming in many directions and plotting the energy in the output signal as a function of direction an audio image is created.

Upon the acoustic image co-registered with the space of interest being formed, a user selects the target of interest on the image through the graphical user interface.

In order to identify prominent peaks in the image, a gradient ascent algorithm is applied to the audio image. For greater accuracy, sub-pixel estimates of the true peak locations are found by interpolation of the audio image near the peak position. A list of peaks in the image is then created, and the peak that is the closest to the target location (direct signal) is assumed to be the true source location corresponding to the direct sound arrival.

The beamformer is then applied for this particular direction, and a time domain output of the beamformer is created for the direction of the target source and for the direction of all other prominent peaks in the image.

Further, a peak matching procedure is applied that uses a similarity function between the beamformer outputs for peak directions. The output of the similarity function is used to establish the fat that two peaks in the image in fact correspond to the same acoustic source. Various similarity functions may be considered for this task; one possibility is a MFCC (Mel-frequency cepstral coefficients) formulation. Thresholding on the matching score is used to determine if the signal is sufficiently similar to the desired one. Signals that are similar enough are assumed to be the reflections of the desired source.

After identifying the reflections originating from the desired source, the algorithm proceeds with coherent summation of the signals corresponding to the identified reflections. In order to do that, the time delays between the direct signal and the reflections are estimated, and once found, the reflection signals are advanced appropriately and are added to the direct signal.

In another aspect, the present invention constitutes a system for dereverberation of signals propagating in a reverberative space of interest which includes:

a sensor unit, for example a multichannel audio camera, a beamforming processor coupled to the sensor unit to form a real-time image of signals arrived at the sensor unit, wherein the image constitutes a map of energy distribution in the space surrounding the sensor unit, and a computational unit operatively coupled to the audio image to calculate an output dereverberated signal through correlation of the directly arrived signal and its significant reflections and coherently adding the same each to the other.

The computational unit includes a peaks identification unit for identification of peaks corresponding to signals arrived directly from sources of interest, and secondary peaks corresponding to signals representing either reflection signals of the source of interest, and/or directly arrived signals from other sources of interest, and/or the reflections of the other sources of interest.

The computational unit further includes a beamforming processor for applying beamforming procedure to signals propagating in a direct path and the paths corresponding to secondary peaks.

Further, the computational unit includes a similarity measure evaluation unit coupled to the beamforming processor to calculate a similarity score between the directly arrived signal and those constituting the reflections, or other signal sources, or reflections of other sources, and defining those secondary signals as reflection signals of the target source of interest if the similarity score reaches a predetermined threshold.

The computational unit further includes a time delay unit to estimate time delays between the directly arrived signal and its reflections, and a summing unit coupled to the time delay unit for coherently summing the reflection signals to the directly arrived signal with appropriate time delays.

In the computational unit, the similarity measure evaluation unit includes a grouping unit for grouping the peaks found in the image in accordance with the similarity score thereof.

This and other objects of the present invention will become clear from a further detailed description of the present invention taken in conjunction with the accompanying Patent Drawings presented in the Application.

BRIEF DESCRIPTION OF THE DRAWINGS

FIGS. 6A-6D are the representations of the MFCC similarity metric computed on the beamformer output. FIGS. 6A and 6C represent peak positions where the similarity metric suppresses the peaks corresponding to distracters (corresponding target peaks along with the distracter are shown in FIGS. 6B and 6D, correspondingly);

FIGS. 7A-7D are diagrams representing delays which are computed between the target and each of the reflections selected for incorporation into the matched filter processing; and FIGS. 8A-8C are diagrams representing the dereverberated signal using the proposed approximate MFA filter (FIG. 8B) built based on the subject algorithm of the present invention, compared with the single-channel recording (FIG. 8A) and with the original wave form (FIG. 8C).

DETAILED DESCRIPTION OF THE PREFERRED EMBODIMENT

Figure 1:
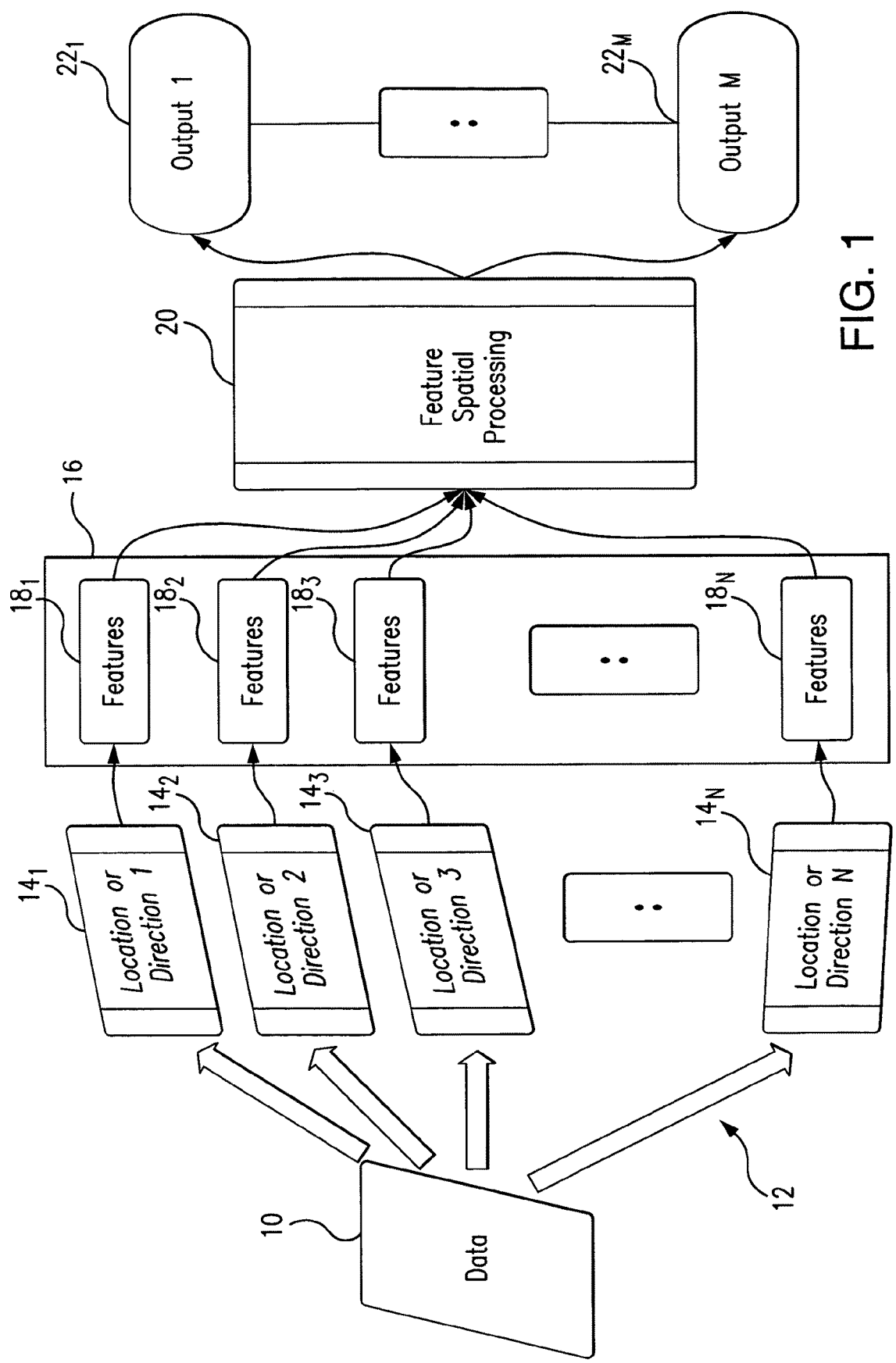
FIG. 1 is a schematic representation of the general concept underlying the operation of the present method and system.

Referring to FIG. 1, illustrating a basic concept underlying the general principles of the subject method and system for dereverberation of signals propagating in reverberative environments, when a signal 10 (also referred to herein as data) propagates in a space of interest 12, it may be affected by the reverberating surfaces. The signal reaching a sensor in a realistic environment contains, in addition to the part which arrives directly from the signal source, also a number of environmental reflections. The directly arrived signals, as well as the number of the reflections, have their respective direction of propagation $14_1, 14_2, 14_3, \ldots 14_N$.

When a representation of spatial distribution of signals mapped to the space of interest (further also referred to herein as an image 16) is calculated, the source signal, as well as its significant reflections, manifest themselves as specific features 18 found in the image 16, which may be seen in the form of intensity peaks. The present computational algorithm 20 is applied to the image 16 to process the features 18, as well as their locations on the image 16, in order to recover one or a plurality of signal sources and their corresponding reflections $22_1 \ldots 22_M$.

Although the principles of the subject invention are perfectly applicable to any nature of the propagating wave signal, e.g., acoustic, optical, radio frequency, etc., for the sake of clarity, and as an example only, but not to limit the scope of the present invention thereto, the following description will be presented with regard to acoustic signals propagating in an environment of interest.

Figure 2A:
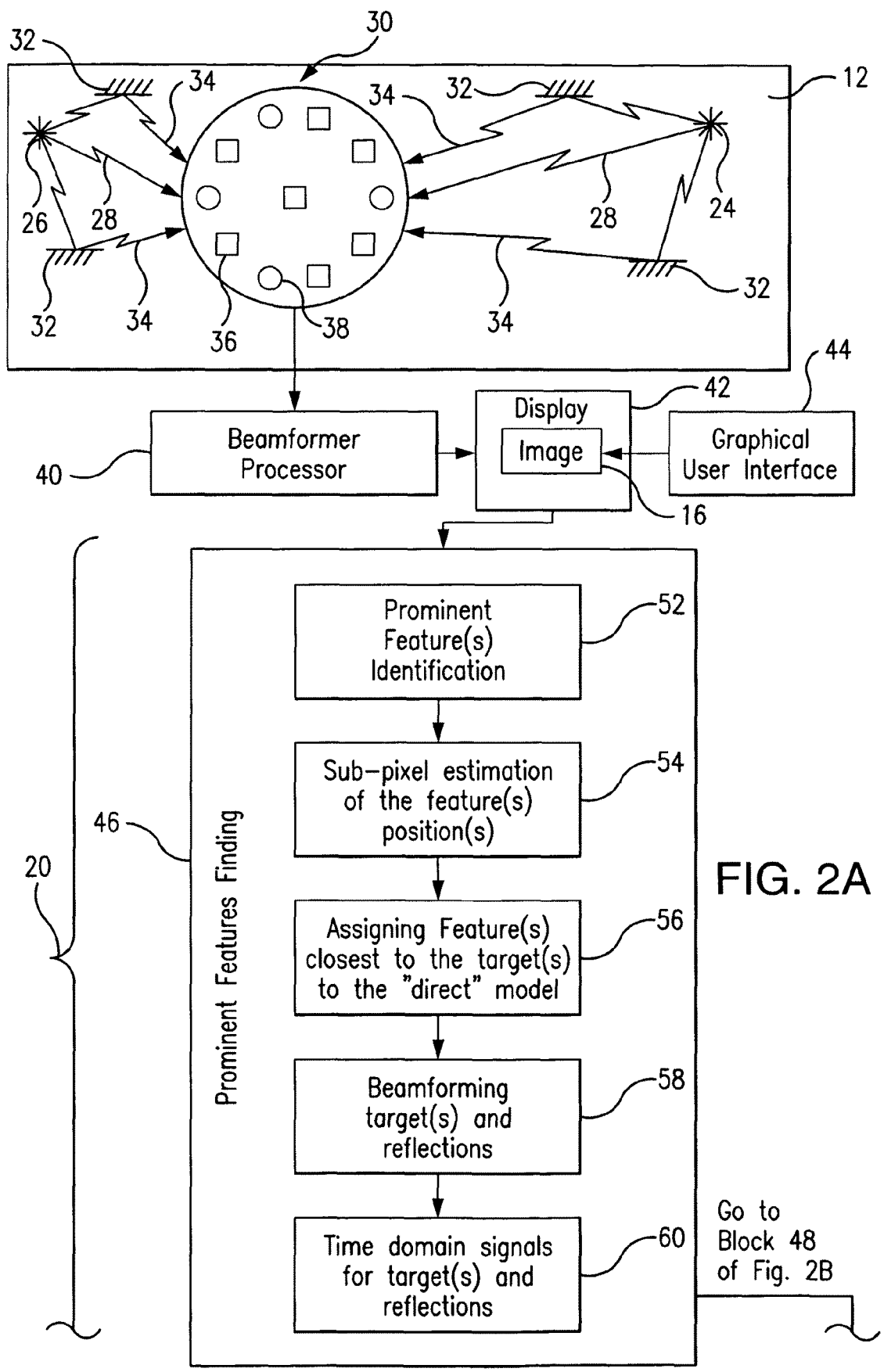
FIGS. 2A-2B represent schematically the system of the present invention.
Figure 2B:
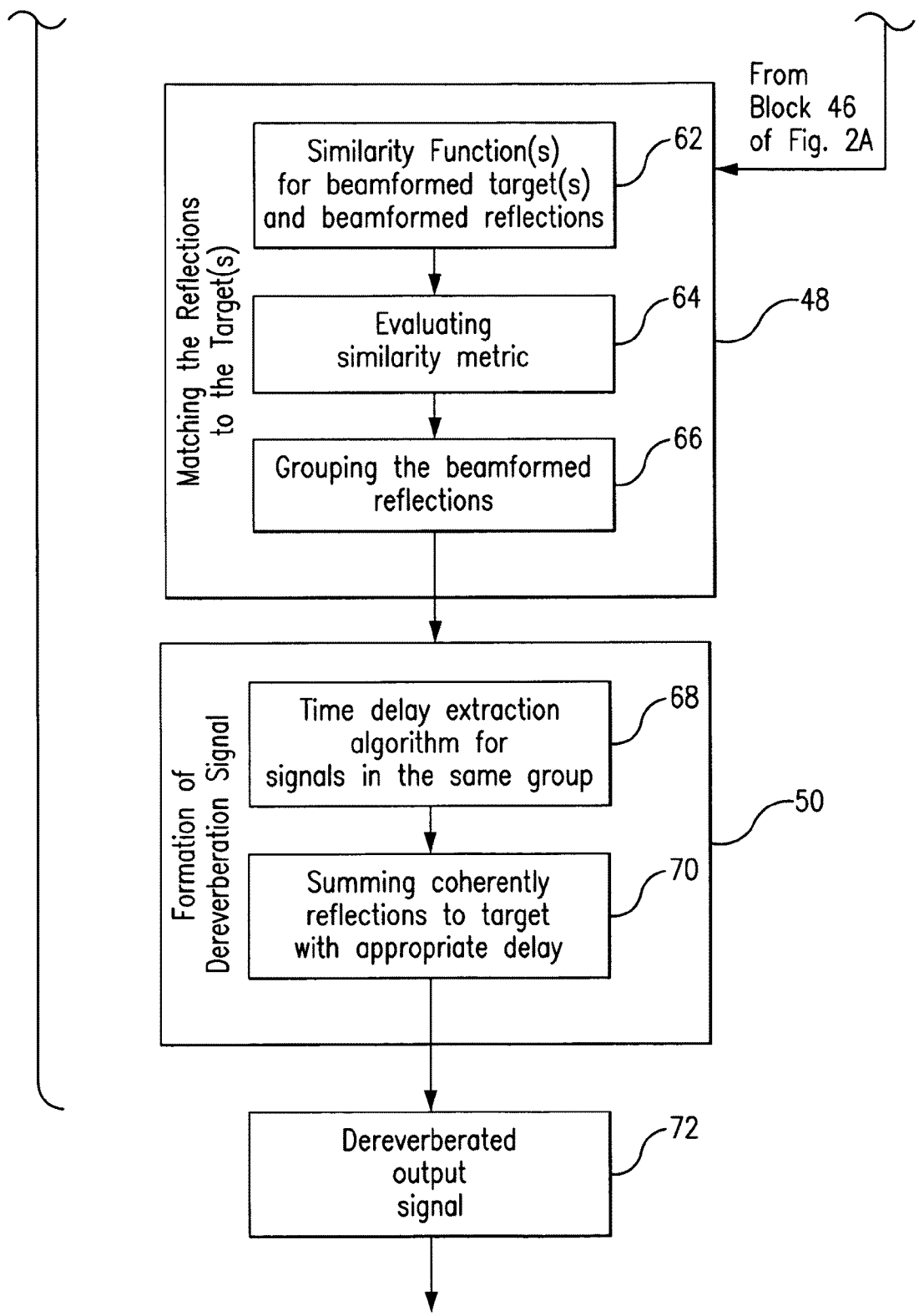

Referring to FIGS. 2A-2B, the space of interest 12 contains one, or a plurality, of acoustic source(s). As an example, two acoustic sources 24 and 26 are considered for the simplicity of further description. A signal 28 emitted by the acoustic sources 24 and 26 is not reflected at any surfaces within the space of interest 12 and arrives directly at the sensor unit 30.

The signal emanating from the acoustic sources 24, 26, however, may be a subject to a multiplicity of reflections at reflective surfaces 32 which produce the reflecting signals 34 also arriving at the sensor unit 30. The multiple reflections 34 of the signal emanating from the acoustic sources 24, 26 depend on the geometry of the space of interest 12, as well as the nature of the reflective surfaces 32.

As will be described further in detail, the novel method and system identifies the significant reflections automatically and in real-time to compute the effect of the environment on the signal "on the fly".

In the present system, the sensor unit 30 is an "audio camera" used to compute the "audio image", e.g., a map of acoustic energy distributed in the space surrounding the microphone array. The multichannel (for example 64-channel) spherical microphone array 36 provides the ability to compute the acoustical intensity corresponding to different spatial directions in a given frame of audio-data. These intensities are exhibited as an image 16, also referred to herein as an "audio image", as well as the representation of spatial distribution, which is updated at a high frame rate to achieve a video stream if the data capture and intensity computations are performed sufficiently quickly.

The sensor unit 30, in addition to the spherical microphone array 36, includes one or a plurality of video camera(s) 38 embedded therein. The joint processing of captured frame-arrayed audio and video images enables applications such as visual identification of noise sources, beamforming and noise-suppression in video conferencing, as well as other applications, provided it is possible to account for the spatial differences in the location of the audio and video cameras. Based on the recognition that the spherical array may be viewed as a central projection camera, it is possible to perform such joint analysis.

The symmetric configuration of the sensor 30 permits for digital steering of the beamformer in an arbitrary direction without distorting the beampattern shape. The beamforming procedure is applied to the acquired acoustic signals in a Beamformer Unit 40, shown in FIG. 2A. As an example, a beamformer for the spherical array framework described in J. Meyer, et al., "A highly scalable spherical microphone array based on an orthonormal decomposition of the soundfield" Proc. IEEE ICASSP 2002, Orlando, Fla., v. 2, pp. 1781-1784, B. Rafaely (2005), "Analysis and design of spherical microphone arrays", IEEE Trans. Speech and Audio Proc., vol. 13, pp. 135-143, and Z. Li and R. Duraiswami (2007), "Flexible and optimal design of spherical microphone arrays for beamforming", IEEE Trans. Audio, Speech, and Language Proc., vol. 15, pp. 702-714, as well as in U.S. Pat. No. 7,587,054 issued to G. W. Elko, et al., may be used in the present system.

Figure 4:
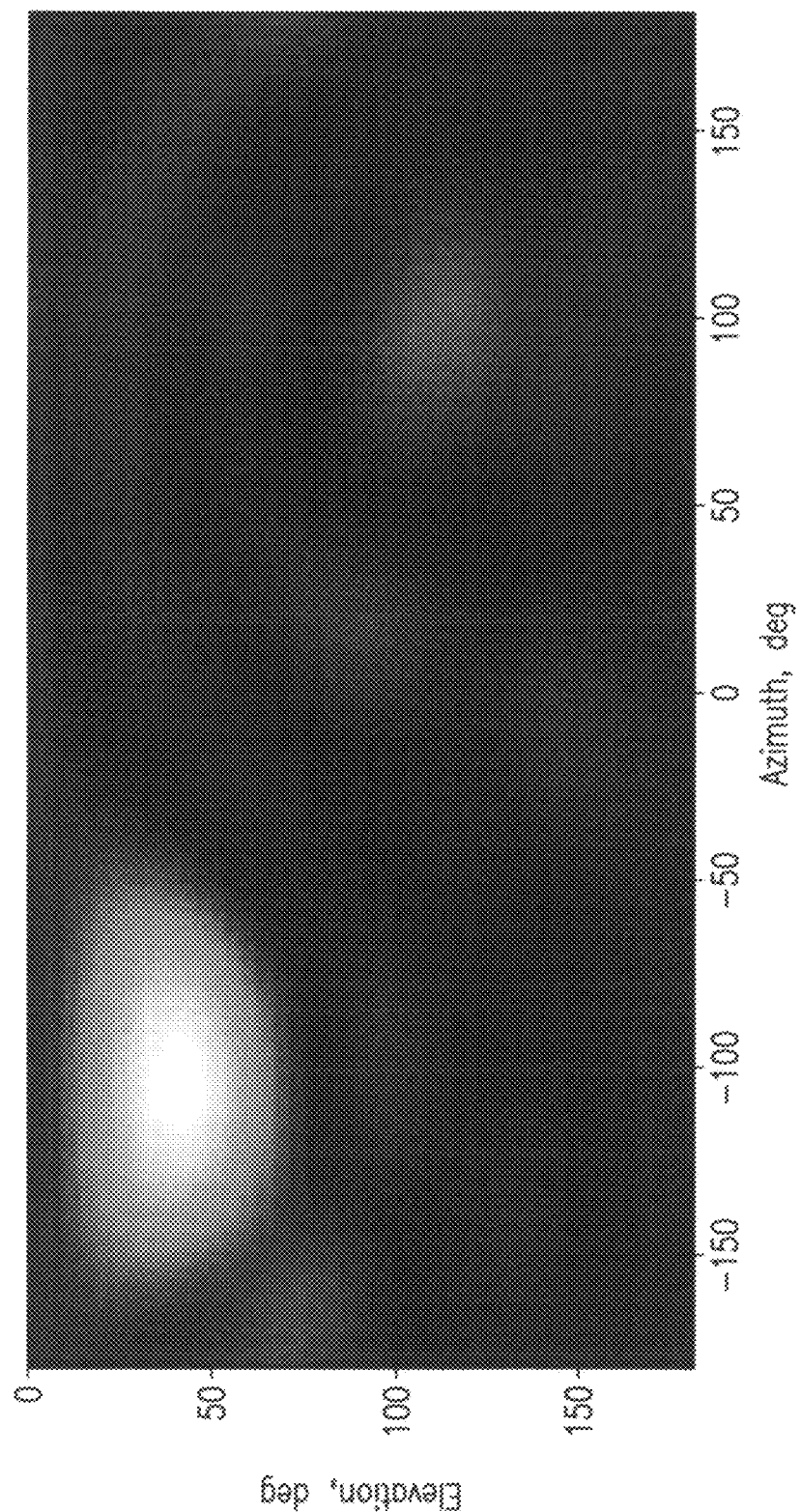
FIG. 4 is a representation of the audio image created by the spherical microphone array.

The beamformer 40 operates by decomposing the acoustic wavefield into a number of spherical modes corresponding to elementary solutions of the acoustic wave propagation equation and then combining the modes with weights derived from the desired beampattern. In the current implementation, high-resolution real-time audio imaging of the space is achieved by operating a number of independent beamformers in parallel on graphical processing hardware (GPU). By beamforming in many directions and plotting the energy of the output signal as a function of direction, the "audio image" 16 is created, which is shown as an example in FIG. 4.

The projection equations of the audio camera are essentially the same as for common (video) central projection camera, which allows one to use many algorithms developed for computer vision (such as multi-camera calibration or epipolar constraints) with an audio camera or with multiple modalities. In particular, visual analysis of acoustic energy distribution in the space may be performed by calibrating audio and video cameras in a common reference frame and overlapping evolving audio and visual images of the environment, as presented in A. E. O'Donovan, R. Duraiswami, and D. N. Zotkin (2008), "Imaging concert hall acoustics using visual and audio cameras", Proc. IEEE ICASSP 2008, Las Vegas, Nev., pp. 5284-5287.

The goal of beamforming is to "steer" a "beam" towards the source of interest and to pick its contents up in preference to any other competing sources or noise. The simplest "delay and sum" beamformer takes a set of TDOAs (Time Difference of Arrival) which determine where the beamformer is steered, and computes the output $S_B(t)$ as $$s_B(t) = \frac{1}{K} \sum_{m=1}^{K} s_m(t + \tau_{ml}), \quad \text{(Eq. 3)}$$

where l is a reference microphone which can be chosen to be the closest microphone to the sound source so that all $\tau_{ml}$ are negative and the beamformer is causal. To steer the beamformer, TDOAs corresponding to a known location source location are selected. Noise from other directions will add incoherently, and decrease by a factor of $K^{-1}$ relative to the source signal which adds up coherently.

More general beamformers use all the information in the K microphone signal at a frame of length N, may work with a Fourier representation, and may explicitly null out signals from particular locations (directions) while enhancing signals from other locations (directions). The weights are then usually computed in a constrained optimization framework.

Patterns formed when the usually frequency-dependent weights of a beamformer are plotted as an intensity map versus location are called the beam patterns of the beamformer. Since usually beamformers are built for different directions (as opposed to location), for sources that are in the "far-field," the beampattern is a function of two angular variables. Allowing the beampattern to vary with frequency gives greater flexibility, at an increased optimization cost and an increased complexity of implementation One way to perform source localization is to avoid nonlinear inversion, and scan space using a beamformer. For example, if using the delay and sum beamformer, the set of time delays $\hat{\tau}_{mn}$ corresponds to different points in the world being checked for the position of a desired acoustic source, and a map of the beamformer power versus position may be plotted. Peaks of this function will indicate the location of the sound source.

Thus via using the audio camera 30 which combines the spherical microphone array 36 with video cameras 38, as well as analog-to-digital conversion with the signal conditioning hardware, the acoustic image 16 is formed and displayed at a Display Unit 42. It is to be understood, that the image 16 is only a specific example of a representation of the spatial distribution of signals mapped to the space of interest. For example, such a representation may be in the form of a multi-dimensional array, or a table containing pertinent data arranged in a preferred fashion, and may be "displayed" to a user through printing, plotting, etc. All types of representations of data spatial distribution, as well as "display" means, are contemplated within the scope of the present invention.

The image 16, since it is linked with direction, may be used to identify source location (direction), be related with physical objects, and identify sources of sound.

By recognizing that the spherical array derived sound images satisfy central projection, a property crucial to geometric analysis of multi-camera systems, it is possible to calibrate camera-spherical array systems, and perform vision-guided beamforming. In the present system, frame-rate sound image creation, beamforming, and the processing of the sound image stream along with a simultaneously acquired video-camera image stream, to achieve "image-transfer," i.e., the ability to warp one image onto the other to determine correspondence, is achieved. The feature that enables speed is to use modern graphics processors (GPUs) to do the processing at frame-rate.

Beamforming with Spherical Microphone Arrays

For sound captured at N microphones at locations $\Theta_s=(\theta_s, \phi_s)$ on the surface of a solid spherical array, two approaches to the beamforming weights are possible. The model approach relies on orthogonality of the spherical harmonics and quadrature on the sphere, and decomposes the frequency dependence. It, however, requires knowledge of quadrature weights, and theoretically for a quadrature order P (whose square is related to the number of microphones S) can only achieve beampatterns of order P/2. Another approach requires the solution of interpolation problems of size S (potentially at each frequency), and building of a table of weights.

In each case, to beamform the signal in direction $\Theta_s=(\theta_s,\phi_s)$ at frequency f (corresponding to wavenumber $k=2\pi f/c$, where c is the sound speed), the Fourier transform of the pressure at the different microphones, $d_s^k$ is summed up as $$\psi(\Theta; k) = \sum_{s=1}^{S} w_N(\Theta, \Theta_s, ka) d_s^k(\Theta_s). \qquad \text{(Eq. 4)}$$

In the model case the weights $w_N$ are related to the quadrature weights $C_n^m$ for the locations $\{\Theta_s\}$, and the $b_n$ coefficients obtained from the scattering solution of a plane wave off a solid sphere $$w_N(\Theta, \Theta_s, ka) = \sum \frac{1}{2i^n b_n(ka)} \sum_{m=-n}^{n} Y_n^{m*}(\Theta) Y_n^m(\Theta_s) C_n^m(\Theta_s). \qquad \text{(Eq. 5)}$$

For the placement of microphones at special quadrature points, a set of unity quadrature weight $C_n^m$ are achieved. In practice, it has been observed that for $\{\Theta_s\}$ at the so-called Fliege points, higher order beampatterns were achieved with some noise (approaching that achievable by interpolation $(N+1)=\sqrt{S}$).

Joint Audio-Video Processing and Calibration

The intensity image at different frequencies created via beamforming using a spherical array may be treated as a central projection (CP) camera, since the intensity at each "pixel" is associated with a ray (or its spherical harmonic reconstruction to a certain order). When two CP cameras observe a scene, they share an "epipolar geometry". Given two cameras and several correspondences (via a calibration object), a fundamental matrix that encodes the calibration parameters of the camera and the parameters of the relative transformation (rotation and translation) between the two camera frames may be computed. Given a fundamental matrix of a stereo rig it is possible to take points in one cameras coordinate system and relate them directly to pixels in the second cameras coordinate system. Given more video cameras, a complete solution of the 3D scene structure common to the two cameras can be made, and an "image transfer" that allows the transfer of the audio intensity information to actual scene objects may be formed precisely. Given a single camera and a microphone array, the transfer may be accomplished if it is assumed that the world is planar (or that it is on the surface of a sphere) at a certain range.

Audio information is acquired using the solid spherical microphone array of radius 10 cm whose surface is embedded with microphones. The signals from the microphones are amplified and filtered using two custom 32 channel preamplifiers and fed to two National Instruments PCIe-6259 multi function data acquisition cards. Each audio stream is sampled at a rate of 31250 samples per second. The acquired audio is then transmitted to an NVidia G8800 GTX GPU installed in a computer running Windows XP with an Intel Core2 processor and a clock speed of 2.4 GHz with 2 GB of Ram. The NVidia G8800 GTX GPU utilizes a 16 SIMD multiprocessors with On-Chip Shared Memory. Each of these Multiprocessors is composed of 8 separate processors that operate at 1.35 GHz for a total of 128 parallel processors. The G8800 is also equipped with 768 MB of onboard memory. In addition to audio acquisition, video frames are required from a micro IBot USB20 web camera at a resolution of 640×480 pixels and a frame rate of 10 frames per second. The images are acquired using OpenCV and are also immediately transmitted to the onboard memory of the GPU.

Since both pre-computed weights and analytically prescribed weights capable of being generated "on-the-fly" are used, the generation of images for both cases is presented in further paragraphs.

Pre-Computed Weights:

This algorithm proceeds in a two stage fashion: a precomputation phase (run on the CPU) and a run-time GPU component. In the first stage, pixel locations are defined prior to run-time and the weights are computed using any optimization method as described in the literature. These weights are stored on disk and loaded only at Runtime. In general the number of weights that must be computed for a given audio image is equal to PMF where P is the number of audio pixels, M is the number of microphones, and F is the number of frequencies to analyze. Each of these weights is a complex number of 8 bytes.

After pre-computation and storage of the beamformer weights in the run-time component, the weights are read from disk and transmitted to the onboard memory of the GPU. A circular buffer of size 2048×64 is allocated in the CPU memory to temporarily store the incoming audio in a double buffering configuration. Every time 1024 samples are written to this buffer, they are immediately sent to a pre-allocated buffer on the GPU. While the GPU processes this frame the second half of the buffer is populated. This means that in order to process all of the data in real-time all of the processing must be completed in less than 33 ms.

Once audio data is on the GPU, an in-place FFT is started using the cuFFT library in the NVidia CUDA SDK. A matrix vector product is then performed with each frequency's weight matrix and the corresponding row in the FFT data, using the NVidia CuBlas linear algebra library. The output image is segmented into 16 sub-images for each multiprocessor to handle. Each multiprocessor is responsible for compiling the beamformed response power in three frequency bands into the RGB channels of the final pixel buffer object. Once this is completed, control is restored to the CPU, and the final image is displayed to the screen as a texture mapped quad in OpenGL.

"On the Fly" Weight Computation:

In this implementation there is a much smaller memory footprint. Whereas the space needed to be allocated for weights on the GPU in the previous algorithm, the "on-the-fly" computation only needs to store the location of the microphones. These locations are read from disk and transmitted to the GPU memory.

Efficient processing is achieved by making use of the spherical harmonics addition theorem which states that $$P_n(\cos\gamma) = \frac{4\pi}{2n+1} \sum_{m=-n}^{n} Y_n^{-m}(\Theta) Y_n^m(\Theta_s) \quad \text{(Eq. 6)}$$

where $\Theta$ is the spherical coordinate of the audio pixel and $\Theta_s$ is the location of the sth microphone, $\gamma$ is the angle between these two locations and $P_n$ is the Legendre polynomial of order n. This observation reduces the order $n^2$ sum in Eq. 5 to an order n sum. The $P_n$ are defined by a simple recursive formula that is quickly computed on the GPU for each audio pixel.

The computation of the audio proceeds as follows: First, the audio signal is loaded onto the GPU and an inplace FFT is performed. Then the audio image is segmented into 16 tiles and each tile is assigned to a multiprocessor of the GPU. Each thread in the execution is responsible for computing the response power of a single pixel in the audio image. The only data that the kernel needs to access is the location of the microphone in order to compute $\gamma$ and the Fourier coefficients of the number of microphone signals for all frequencies to be displayed. The weights can then be computed using a simple recursive formula for each of the Hankel, Bessel, and Legendre polynomials in Eq. 5.

There are several benefits to the "on-the-fly" approach including the: 1) frequencies of interest may be changed at runtime with no additional overhead; 2) pixel locations may be changed at runtime with little additional overhead; and 3) memory requirements are drastically lower then storing pre-computed weights.

Having the audio image 16 on the display unit 42, a user selects the target of interest, e.g., acoustic source of interest, on the image via the Graphical User Interface 44. Once a source location of interest is identified, audio signals associated with that direction may be identified. The intensity of the audio pixel for a given direction is proportional to the Fourier component of the corresponding frequency in the acoustic signal. By computing the intensity of the audio pixels for a given location for all frequencies in the microphone array effective frequency band the signal may be recovered and isolated. For frequencies outside the effective range of the array, the Fourier coefficients of the raw audio signal from the closest microphone are appended.

Referring again to FIGS. 2A-2B, the computing algorithm 20 of the present invention includes a Prominent (Peak) Features Finding unit 46, Matching Unit 48, and Dereverberated Signal Formation unit 50.

The Prominent Features Finder 46 may apply a number of algorithms, such as, for example:
(a) Repeated gradient ascent algorithm;
(b) Stochastic region contraction algorithm;
(c) Mean-shift algorithm;
(d) Peak finder algorithm built into the MATLAB software;
(e) Specialized parallel hardware implementation; as well as many others.

In one embodiment of the subject system, as an example only, but not to limit the scope of the present invention, a gradient ascent algorithm may be applied to the beamformer outputs that are formed in various directions in the image 16. The gradient ascent algorithm is similar to the mean-shift algorithm which outputs the peaks identified in block 52.

The logic further flows to block 54 where, for greater accuracy, sub-pixel estimates of the true peak locations identified in block 52 may be determined by interpolation near the peak positions. This may be performed, for example, by applying hill-climbing algorithms to the prominent features identified in block 52 to find the highest peaks that are above a predetermined threshold. A list of peaks in the image is then created, and the peak that is closest to the target location is assigned in block 56 to the "direct" model, e.g. it is assumed to be the true source location corresponding to the direct sound arrival.

In block 58, the beamformer processor is further applied for the particular direction found in block 56, as well as other prominent peaks. The time domain output of the beamformed "direct" signal and the reflections, i.e., for all the prominent peaks in the image is created in block 60. In block 58, a standard beamforming procedure described in J. Meyer, et al. "A highly scalable spherical microphone array based on an orthonormal decomposition of the sound field", preceding IEEE ICASSP 2002, Orlando, Fla. Vol. 2, pp. 1781-1784 may be used for the directions of peaks. Alternatively the plane-wave decomposition described in "Sound field decomposition using spherical microphone arrays". D. N. Zotkin, R. Duraiswami, and N. A. Gumerov. Proc. IEEE ICASSP 2008, Las Vegas, Nev., April 2008, pp. 277-280 may be used.

The identified prominent features, i.e., the peaks, other than the "direct" signal, may correspond either to the reflections of the desired source, to other sources, or to their reflections. In order to determine the origin of each peak, an acoustic similarity measure may be used which is performed in the Matching Unit 48 of the subject computational algorithm 20.

Matching the peaks to the target source of interest is in general a hard combinational problem. In the subject algorithm 20, a peak-matching procedure is applied that uses a similarity function between the beamformer outputs for peak directions found in block 58 of the peak feature finder 46 to derive a similarity measure for them. Various similarity functions may be considered to be performed in block 62. The similarity measure computations include two stages: the first stage is commonly called "extracting the features" and the second stage is commonly called "feature matching". The "feature matching" is commonly done by generic clustering means. Possible "extracting the features" approaches envisioned for the present technique may include, among many other computational approaches, the following:
  (f) Mel-Frequency Cepstral Coefficients (MFCC);
  (g) Linear Predictor Coefficients (LPC);
  (h) Short-Term Fourier Transform Coefficients (STFT);
  (i) Frequency-domain Perceptual Linear Prediction (FD-PLP) coefficients;
  (j) Neuromorphic auditory spectral features, a.k.a. spectro-temporal response function (STRF) based decomposition;
  (k) Wavelet decomposition coefficients; as well as many others.

Possible clustering approaches applicable in the subject system and method, may include:
  (l) Vector quantization (VQ);
  (m) Gaussian mixture modeling, which may be considered a "soft" version of VQ;
  (n) Support vector machines (SVM);
  (o) Linear discriminant analysis (LDA); as well as many others.

For example, in one of the alternative embodiments of the subject system and method, the peak matching in the subject system may be performed through the Mel-frequency cepstral coefficients (MFCC) formulation which may have advantages for speaker verification in speech processing.

In order to compute the MFCC in block 62, the short time Fourier transform of a signal frame is performed and the power in certain frequency bands spaced logarithmically on the frequency axis is computed. The rationale of this operation lies in the fact that such a filter bank mimics the resolution of mammalian auditory system.

Subsequently, the discrete cosine transform is taken of the power values in the filter bank output. 13 MFCC coefficients may be computed. The first coefficient corresponds to the total signal power and is often discarded. Sometimes first and/or second order derivatives of MFCC are computed and added to the feature vector.

Alternatively, in the present algorithm, a cubic root is used instead of a logarithm with a compression function in the MFCC computation. This choice is based on the fact that the cubic root compression function better models the function of mammalian cochlea.

The coefficients are normalized individually across the time dimension and are fed to a clustering processor, for example, the vector quantization (VQ) training procedure with the code book to build the code book for the target (direct) signal (i.e., the signal computed by applying the beamformer to the true source location in block 58).

In order to use MFCC feature vectors in the VQ framework, the coefficients are normalized individually to zero mean and unit variance across the time dimension. The VQ coding error is then evaluated for signals corresponding to all the peaks in the energy map, yielding a matching score.

The present algorithm further uses cross matching of testing and training wave files (i.e., when comparing wave A to wave B, sets of MFCC features for A and for B are computed, code books AC and BC for those are computed, A is matched to BC and B is to matched to AC, and the matching scores are averaged thus using both scenarios of A as a training and B as a testing sample and vice versa).

Thresholding of the matching score is used to determine if the signal is sufficiently similar to the desired one. Signals that are similar enough are assumed to be the reflections of the desired (target) source.

In addition to the building vector quantization code book for the target source signal and encoding feature vectors of the reflection signal with the code book as the computation means of the similarity measure, alternatively, vector machines may be used to compute the similarity measure. Also, it is envisioned that Gaussian mixture model fitting procedure may be used as computation means of the similarity measure in the present system.

Upon evaluating the similarity metric for the beamformed target signal and beamformed secondary signals in block 64, those are grouped in sets in accordance with their similarity measure in block 66, and the logic flows to block 50 which is the portion of the algorithm concerned with the dereverberation signal formulation. In the unit 50, after identifying the reflections originating from the desired source and grouping the same in a common set of the peaks, the computational algorithm 20 proceeds with coherent summation of the signals corresponding to those in block 70.

In order to accomplish this, it is necessary to estimate time delays between the direct signal and the reflections. One possible approach is to compute a generalized cross-correlation function of the direct signal and reflections. However, this has been found to be less reliable in reverberant conditions.

Another time delay estimation algorithm which runs in block 68, that is more robust but also more computationally expensive, may be based on adaptive Eigen value decomposition (AED). A modified AED algorithm is used for time delay estimations between the signals belonging to the same peak group recorded in block 66. Once the time delays are found in block 68, the reflection signals may be advanced appropriately and are added to the direct signal in block 70 to form the dereverberant output signal 72.

Figure 3A:
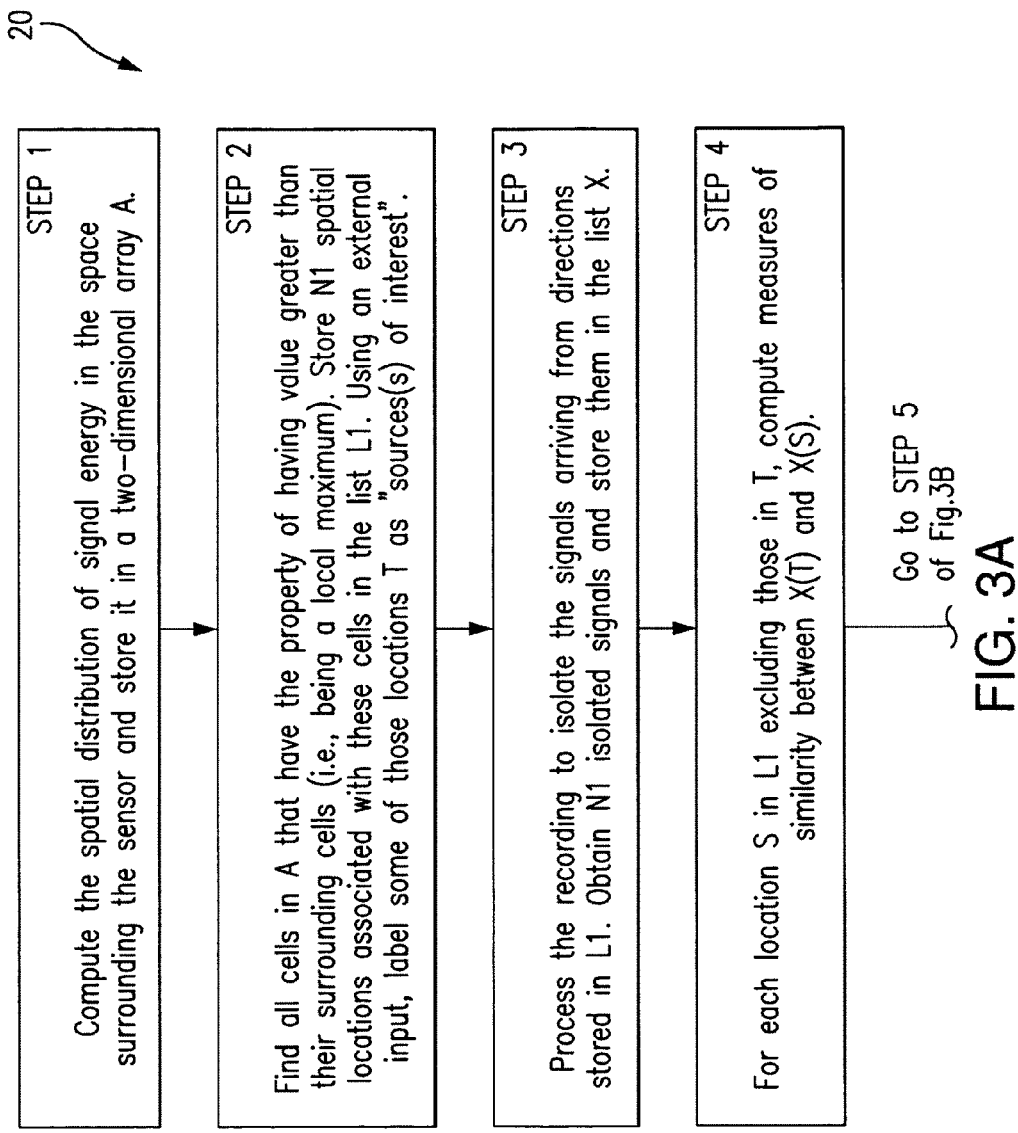
FIGS. 3A-3B are the flow-charts representing the sequence of steps of the subject method in one embodiment thereof.
Figure 3B:
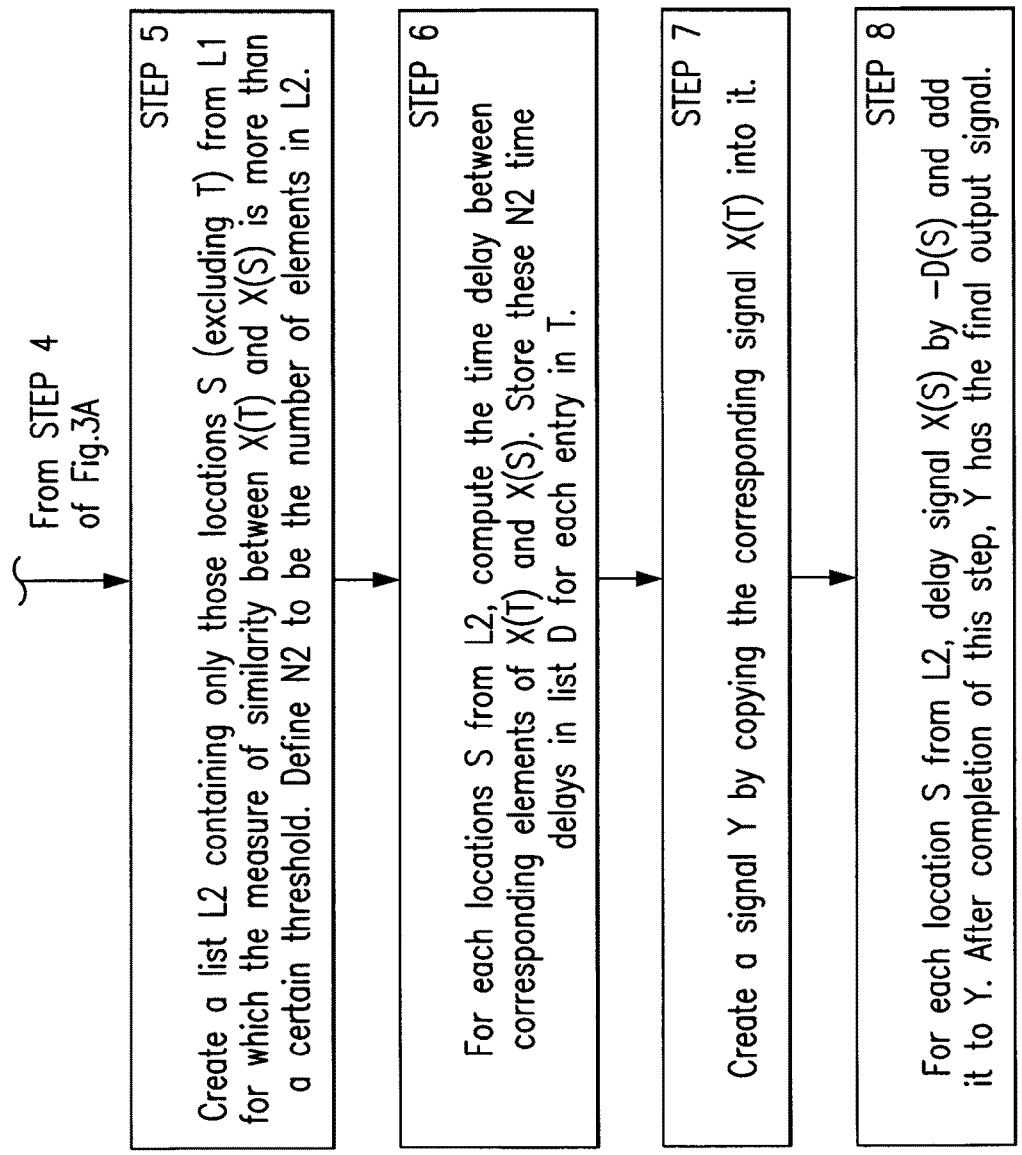

Referring again to FIGS. 1 and 2A-2B, and further to FIGS. 3A-3B, which is a flow chart diagram of the detailed sequence of steps of one of the embodiments of the present method supported by the system presented in FIGS. 2A-2B, the computational logic 20 of the present invention performs the following sequence of steps:

Step 1:

Compute the spatial distribution of signal (direction $14_1, \ldots 14_N$) of signal energy 10 in the space 12 surrounding the sensor and storing the directions $14_1 \ldots 14_N$ in a 2-dimensional array A.

Step 1 is usually performed via a number of simultaneous beamforming operations in the beamforming processor 40. The result of the beamforming procedure is the audio image 16 which may be represented digitally on a display or, alternatively, with any representation of the array A shown in Table 1.

Although the 10×10 sample array A is shown in Table 1, in real implementations the dimensions of the array A may be in the range of 1024×1024. The spatial distribution of the signal energy in the space surrounding the sensory unit is computed in the spherical coordinate system with the azimuth ranging from 0-360°, and elevation ranging from 0-180°.

TABLE 1

| 9 | 10 | 10 | 10 | 9 | 8 | 5 | 2 | 1 | 0 |
| 9 | 11 | 11 | 10 | 9 | 11 | 7 | 4 | 3 | 1 |
| 11 | 12 | 11 | 11 | 10 | 9 | 8 | 4 | 5 | 2 |
| 12 | 13 | 14 | 12 | 10 | 7 | 5 | 3 | 3 | 3 |

TABLE 1-continued

| 12 | 13 | 13 | 12 | 9 | 7 | 6 | 5 | 4 | 3 |
|----|----|----|----|---|---|---|---|---|---|
| 11 | 12 | 11 | 10 | 9 | 8 | 7 | 6 | 5 | 4 |
| 9  | 8  | 8  | 8  | 8 | 7 | 6 | 7 | 4 | 3 |
| 6  | 6  | 7  | 7  | 7 | 6 | 5 | 6 | 3 | 3 |
| 4  | 5  | 6  | 8  | 6 | 5 | 4 | 4 | 2 | 2 |
| 3  | 4  | 5  | 7  | 6 | 5 | 4 | 3 | 2 | 1 |

Step 2:

Further, the logic flows to Step 2 in FIG. 3A where all cells in the array A that have the property of having value greater than their surrounding cells, i.e., being a local maximum, are found. The operation for finding all cells in the array A is performed via a number of gradient ascent algorithm runs.

Further, the logic stores N1 spatial locations associated with the local maximum cells in the list L1, the sample of which is presented in Table 2. Using an external input (i.e., the user may select the target of interest T on the image), some of those locations T are labeled as "source(s) of interest".

TABLE 2

| N1 = 5, members: | |
|---|---|
| Location 1: | (2, 6) (i.e., cell at row 2, column 6) |
| Location 2: | (4, 3) |
| Location 3: | (3, 9) |
| Location 4: | (7, 8) |
| Location 5: | (9, 4) |

Step 3:

The logic processes the recording to isolate the signals arriving from directions stored in the list L1. The obtained N1 isolated signals are stored in the list X, the sample of which is presented in Table 3.

Step 3 is usually performed by applying N1 beamforming operations for the signals arriving from directions stored in the list L1. It is to be understood that in Step 3 the perfect isolation of the signals in reality is not possible, i.e., the obtained signals are enhanced against the unwanted signals and the background noise (as opposed to fully suppressing the latter).

TABLE 3

| Members: | |
|---|---|
| X(1): | <isolated acoustic signal arriving from location 1> |
| X(2): | <isolated acoustic signal arriving from location 2> |
| X(3): | <isolated acoustic signal arriving from location 3> |
| X(4): | <isolated acoustic signal arriving from location 4> |
| X(5): | <isolated acoustic signal arriving from location 5> |

Step 4:

For each location S in the list L1, the logic excludes those in the labeled locations T, and computes measures of similarity between X(T) and X(S). Step 4 is performed using similarity metric. Among a number of similarity metrics, one possibility is to extract features using MFCC and computing distances using vector quantization. Table 4 represents a similarity measure (SM) algorithm scores for the location T=2 which is labeled as source of interest.

TABLE 4

| SM between X(2) and X(1): | 3.18142 |
| SM between X(2) and X(3): | −1.17112 |
| SM between X(2) and X(4): | −0.89203 |
| SM between X(2) and X(5): | 0.31208 |

Step 5:

The logic creates a list L2 containing only those locations S (excluding T) from the list L1 for which the measure of similarity between X(T) and X(S) exceeds a specific threshold. The sample of the list L2 is presented in Table 5. In Table 5, N2 is defined to be the number of elements in the list L2. The threshold selection in Step 5 may be through using operator input, prior knowledge, or experimental evaluations in real environments.

TABLE 5

| N2 = 2, Members: | |
|---|---|
| Location 1: | (2, 6) |
| Location 5: | (9, 4) |

Step 6:

For each location S from the list L2, the logic computes the time delay between corresponding elements of X(T) and X(S). Step 6 may be performed via a number of methods, including but not limited to generalized cross correlation algorithm, and others. N2 numbers of calculated time delays are stored in list D for each entity in T. Table 6 represents the sample of the list D.

TABLE 6

| Members: |
|---|
| D(1) = 418 samples |
| D(2) = 602 samples |

Step 7:

The logic creates a signal Y by copying the corresponding signal X(T), e.g., Y=X(T).

Step 8:

For each location S from the list L2, the logic delays signal X(S) by −D(S) and adds the delayed signal to Y. After completion of the Step 8, Y has the final output signal. Table 7 represents a sample output Y of the Step 8.

TABLE 7

| |
|---|
| Delay X(1) by −418 samples, forming X'(1) - i.e. time-advance it by 418 samples |
| Add X'(1) to Y |
| Delay X(5) by −602 samples, forming X'(5) |
| Add X'(5) to Y |
| Now, Y is the final output of the algorithm |

Experimental Results

The steps of the algorithm have been evaluated in the context of a two speaker experiment that was acquired in a conference room with dimensions of approximately 6.4 m×4 m×2.4 m. A large oval table dominated the center of the room, the sidewalls were fairly reverberant. The floor was treated with carpet, and the ceiling was covered with standard ceiling tiles and lighting fixtures.

Figure 5A:
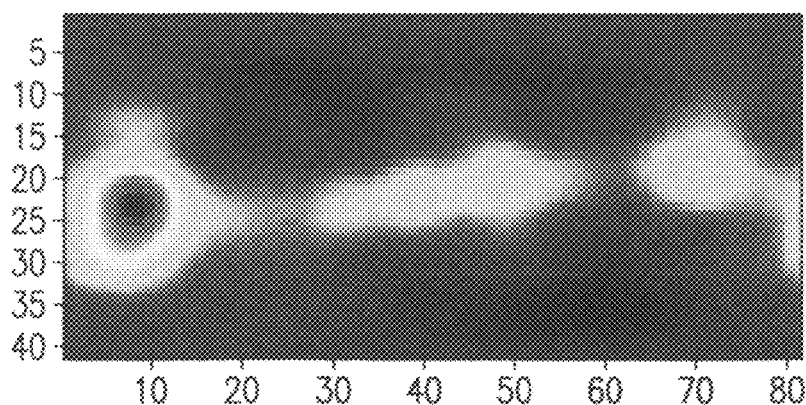
FIGS. 5A-5C are the representations of the audio images acquired for a single female speaker (FIG. 5A), single male speaker (FIG. 5B), and combination of both (FIG. 5C)
Figure 5B:
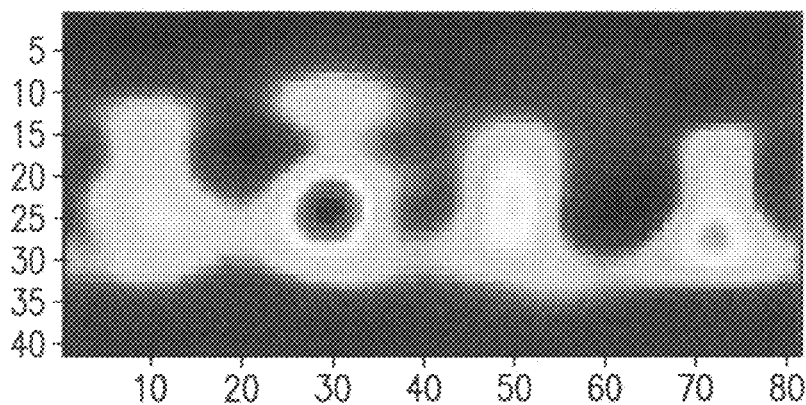
Figure 5C:
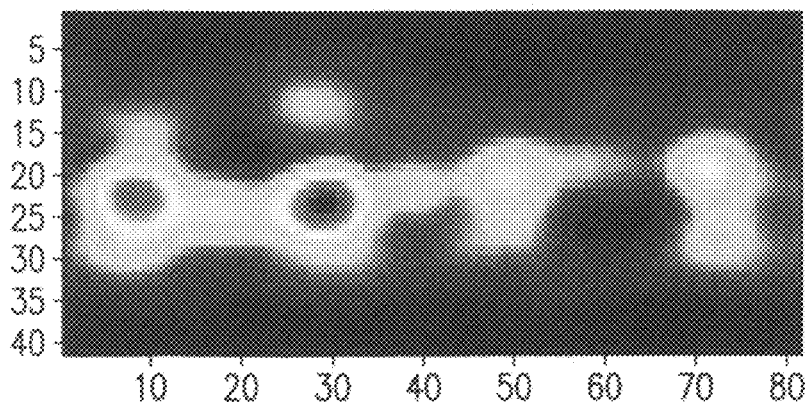

Two loudspeakers were placed on tripods in the room at the opposite ends of the conference table. Two sample sentences (one by male speaker and another by female speaker) were played from the TIMIT database via the loudspeakers, and then both female and male speeches were played simultaneously. FIGS. 5A-5C illustrate the audio images obtained in three scenarios, i.e., FIG. 5A is the audio image of the single male speaker active, FIG. 5B is the audio image for a single female speaker active, and FIG. 5C is the audio image for both speakers active at the same time.

The reverberative patterns are visible in FIG. 5A and FIG. 5B plots. The patterns are seen to overlap in FIG. 5C showing that the reverberation structure for each individual speaker may be recovered, at least visually, when two speakers are active. To verify this, the similarity function described in previous paragraphs was computed between the direct source, i.e., the male speaker, female speaker, and their reflections.

The similarity metric was evaluated between the beamformed target signals and the beamformed reflections at several points in the image and all the local minima were determined. FIGS. 6A-6D represent the similarity metric evaluation. It was found that reflective peaks in the combined image are correctly associated with corresponding source, i.e., for each reflection signal, the matching score is higher for the corresponding originating source than for the other source. FIGS. 6A-6D prove the ability of the similarity metric to suppress the peaks with respect to the distracter.

After obtaining the similarity metric, the audio image peaks are organized into groups according to the originating source, by the similarity measure, and the time delay estimation algorithm was run to find out the time delays between the signals belonging to the same group.

FIGS. 7A-7D represents the results of estimating the time delays. To verify the algorithm, the positions of the sources and signals and of the spherical array were computed using simple geometric reflection models. It was found that the obtained values are each within four samples of the time delays computed geometrically using the measured room dimensions and positions of the loudspeakers, and of the spherical array within the room.

Finally, the beamformed signals in each group are summed up coherently by applying the time delays found, e.g., by delaying them appropriately.

FIGS. 8A-8C show the result of applying the technique on the signal of a single male speaker from the same experiment. It is seen that the target signals are summed up coherently and the voice of the speaker is enhanced compared to the single channel recording. When compared, the output of the subject algorithm (FIG. 8B) with the output of the simple beamformer (FIG. 8A), a decrease in reverberation level is seen in pauses between individual words indicating successful reverberation. The results for the case of mixed speakers are difficult to plot since the speakers are active simultaneously and overlap. Acquiring of the data for two speakers when speaking in turns to make visualization easier is a possibility.

The N element spherical microphone array itself provides a significant gain of the order of $\sqrt{N}$ with respect to the signal at a single microphone, while the proposed technique may improve the gain significantly akin to the matched filter array processing, except that the procedure of picking up the source reflections is automated.

In each plot shown in FIGS. 8A-8C, the data is scaled to full plotting range for details clarity. The addition of the reflections to the original signal (shown in FIG. 8C) increases the signal magnitude (shown in FIG. 8B). Due to the scaling, this is not seen directly but is visible at substantial decrease of the noise level during the beginning of a silent period and in pauses in between individual words indicating successful dereverberation.

The experimental evaluation shows that the technique is viable for reverberation of the signals propagating in reverberating environment, and the results obtained were consistent with expectations.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular applications of elements may be reversed or interposed, all without departing from the spirit or scope of the invention as defined in the appended claims.

What is being claimed is:

1. A method for processing of spatially distributed signals, comprising the steps of:
   (a) providing a sensor unit and a computational unit operatively coupled to said sensor unit for a dynamical processing of a plurality of signals registered at said sensor unit, wherein each of said plurality of signals received at said computational unit includes embedded therein spatial information corresponding to directions of propagation of said plurality of signals; and
   (b) dynamically processing said plurality of signals by said computational unit through the steps of:
   (c) dynamically computing, by said computational unit, a real-time dynamical spatial distribution of said plurality of signals in a dynamically changing space of interest based substantially on azimuth and elevation information contained in said spatial information embedded in said each signal arriving at said sensor unit, and
   (d) dynamically finding at least a first and at least a second signals originating at said at least one signal source by dynamically calculating, substantially in real-time, a similarity measure for said plurality of signals presented in said real-time dynamical spatial distribution based on said azimuth and elevation information, and attributing said at least first signal and said at least second signal from said plurality thereof presented in said real-time dynamical spatial distribution to said at least one signal source of interest based on said real-time similarity measure for dynamically combining said at least one first and second signals into an output deverberated signal with desired characteristics, said output dereverberated signal being correlated to said at least one signal source of interest.

2. The method of claim 1, further comprising the steps of:
   in said step (c), beamforming, by said computational unit, said plurality of signals to create a representation of said spatial distribution of said plurality of signals co-registered with said space of interest, and in said step (d), identifying, at said spatial distribution representation, a plurality of prominent features, and respective propagation directions of said plurality of signals corresponding to said features.

3. The method of claim 2, further comprising the steps of:
   in said step (d), identifying at least one first prominent feature from said plurality thereof corresponding to said at least one first signal arrived directly to said sensor unit from said at least one source of interest, and
   defining said at least one second signal as a reflection signal of said at least one source of interest in said space of interest, if a predetermined value of said similarity measure is reached.

4. The method of claim 3, after said step (d), further comprising the step of:
(e) beamforming said plurality of signals corresponding to said prominent features for said respective directions thereof.

5. The method of claim 4, after said step (d), further comprising the steps of:
(f) estimating time delays between said at least first signal and said reflection signal, and
(g) summing said beamformed reflection signal coherently to said beamformed at least one first signal, thereby forming said output dereverberated signal.

6. The method of claim 2, therein said signals are of acoustic nature, wherein said representation of the spatial distribution is an audio image, and wherein said sensor unit is an audio camera including an array of microphones arranged on a spherically contoured surface.

7. The method of claim 3, further comprising the steps of:
in said step (c), obtaining a real-time spatial distribution representation containing a plurality N of said first prominent features and a plurality of second prominent features,
in said step (d), specifying a target signal source among a plurality N of signal sources, and
applying the similarity measure to said first signal corresponding to said specified target signal source and said plurality of second signals,
wherein said plurality of second prominent features manifest at least one feature selected from a group consisting of reflections of at least one of said plurality N of signal sources, direct path signals from N−1 of said signal sources other than said target signal source, and reflections thereof.

8. The method of claim 4, further comprising the steps of:
creating time domain signals for said beamformed at least one directly arrived signal and said beamformed at least one reflection signal.

9. The method of claim 1,
wherein in said step (d), said similarity measure includes feature vectors computed by using Mel-frequency cepstral coefficients (MFCC).

10. The method of claim 1, further comprising the step of:
in said step (d), computing said similarity measure by building vector quantization code book for said at least one first signal, and encoding feature vectors of said at least one second signal with said code book.

11. The method of claim 1, further comprising the step of:
in said step (d), computing said similarity measure by using Gaussian mixture model fitting procedure or support vector machines.

12. The method of claim 3, further comprising the steps of:
after said step (d), grouping said plurality of prominent features found in said spatial distribution representation in accordance with said similarity measure thereof, and
applying time delay extraction procedure, thereby estimating the time delays between signals belonging to the same group.

13. The method of claim 3, further comprising the steps of:
in said step (c), beamforming said signals by operating a plurality of independent beamforms in parallel.

14. The method of claim 5, wherein said steps (b)-(g) are performed in real-time.

15. The method of claim 5, further comprising the steps of:
in said step (c), computing said spatial distribution via a number of parallel beamforming procedures, and storing spatial distribution data in a multi-dimensional database A;
in said step (d), finding, among said data stored in said database A, cells having properties exceeding properties of surrounding cells,
forming a list L1 of spatial locations S associated with said cells,
labeling at least one T of said spatial locations S in said list L1 as a target source of interest, and processing said spatial distribution representation to find N1 signal arrived from directions corresponding to said locations S recorded in said list L1,
forming a list X of said N1 signals,
for each said location S recorded in said list L1, excluding T, computing said similarity measure between X(T) and X(S), and
creating a list L2 containing said locations S from said list L1 for which said similarity measure between X(T) and X(S) exceeds a predetermined threshold.

16. The method of claim 15, further comprising the steps of:
for each location S in said list L2, computing N2 time delays D(S) between corresponding X(T) and X(S),
storing said N2 time delays in list D,
creating a signal Y corresponding to X(T),
for each location S from said list L2, delaying the signals X(S) by −D(S), and
adding said delayed signal X(S) to said signal Y.

17. A system for processing spatially distributed signals in reverberative environment, comprising:
a sensor unit positioned in a space of interest for detection of a plurality of signals arrived thereat,
a first Beamforming Processor coupled to said sensor unit and configured to receive a plurality of spatially tagged signals from said sensor unit and to form a real-time dynamical image of said plurality of real-time spatially tagged signals spatially mapped to said space of interest, wherein said real time dynamical image is based on azimuth and elevation information embedded in said plurality of signals propagating in said space of interest, and
a computational unit operationally coupled to said real-time image of said plurality of spatially tagged signals and configured to dynamically calculate an output dereverberation signal with desired characteristics,
wherein said computational unit includes:
a Peaks identification Unit configured for dynamical processing of said real-time dynamical image of said plurality of spatially tagged real-time signals spatially mapped to said space of interest and for dynamical identification of at least a first peak and second peaks at said real-time image based on said azimuth and elevation information, wherein said at least first peak corresponds to a first signal arrived directly from at least one source of interest, and wherein said second peaks correspond to said signals including reflection signals,
a second Beamforming Processor for applying beamforming procedure to said first and second signals propagating in directions corresponding to said at least first peak and said second peaks, respectively,
a Similarity Measure Evaluation Unit coupled to said second Beamforming Processor and configured to calculate, substantially in real-time, a similarity measure between said real-time first and real-time second signals identified in said real-time image based on said azimuth and elevation information, and dynamically defining at least one of said second signals as a reflection signal of said at least one source of interest if the real-time similarity measure between said real-time first and said at least one second signals reaches a predetermined threshold, and a Dereverberation Signal Output Unit coupled to said Similarity Measure Evaluation Unit, said Dereverberation Signal Output Unit including:

a Time-Delay Unit configured to estimate time delays between said at least first signal and said reflection signals, and a Summing Unit coupled to said Time Delay Unit and configured to dynamically and coherently add said reflection signals to said first signal with an appropriate time delay.

18. The system of claim 17, where said sensor unit includes an audio camera comprising a plurality of microphones arranged on a spherically contoured surface.

19. The system of claim 17, wherein said Similarity Measure Evaluation Unit further includes a Grouping Unit for grouping said peaks in said real-time image in accordance with the similarity measure thereof.

* * * * *